US006976113B2

(12) United States Patent
Krishnamurthy et al.

(10) Patent No.: US 6,976,113 B2
(45) Date of Patent: Dec. 13, 2005

(54) SUPPORTING NON-HOTSWAP 64-BIT CPCI CARDS IN A HA SYSTEM

(75) Inventors: Ramani Krishnamurthy, Fremont, CA (US); Srinivas Susarla, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 376 days.

(21) Appl. No.: 10/435,733

(22) Filed: May 8, 2003

(65) Prior Publication Data

US 2004/0225802 A1 Nov. 11, 2004

(51) Int. Cl.$^7$ ............................................. G06F 13/00
(52) U.S. Cl. ....................... 710/302; 710/301; 710/303; 710/304
(58) Field of Search ................................. 710/301–304, 710/316; 361/759

(56) References Cited

U.S. PATENT DOCUMENTS

| | | | | |
|---|---|---|---|---|
| 6,286,066 B1 * | 9/2001 | Hayes et al. | ................. | 710/302 |
| 6,363,452 B1 * | 3/2002 | Lach | ........................ | 710/316 |
| 6,578,099 B1 * | 6/2003 | Bassman et al. | ............ | 710/301 |
| 6,671,181 B2 * | 12/2003 | Kaminski | ................... | 361/759 |
| 6,836,810 B1 * | 12/2004 | Klem et al. | .................. | 710/301 |
| 2002/0124128 A1 * | 9/2002 | Qiu | ............................ | 710/302 |
| 2003/0033464 A1 * | 2/2003 | Larson et al. | .............. | 710/302 |
| 2003/0169577 A1 * | 9/2003 | Linares et al. | .............. | 361/788 |
| 2004/0003155 A1 * | 1/2004 | Krontz | ....................... | 710/300 |

OTHER PUBLICATIONS

AE RadiSys,; Platform Management; MD2000 Platform Management Overview; P/N 007-01138-0000; Oct. 2000, 2000 RadiSys Corporation; 1-4; Platform Management and Alarming; pp. 1-6; Components; pp. 7-14.

(Continued)

Primary Examiner—Rehana Perveen
Assistant Examiner—Kim T. Huynh
(74) Attorney, Agent, or Firm—Meyertons Hood Kivlin Kowert & Goetzel, P.C.; B. Noël Kivlin

(57) ABSTRACT

The present invention provides for systems and apparatus that support non-hotswappable (non-HA) 64-bit Compact Peripheral Component Interconnect (CPCI) cards so that customers can use their old legacy (non-hotswappable) cards in the node or input/output (I/O) slots of a hotswappable CPCI system. The system controller card in the CPCI system is responsible for configuring the entire CPCI interface including the width of the CPCI interface (i.e., 32-bit or 64-bit). In one embodiment of the present invention, all the radial HA control signals (e.g., BD_SEL#, HEALTHY#, PCI_RST#) to all of the CPCI slots are implemented separately on some other card (or board), such as a system management card (e.g., an alarm card). At the time of system powerup, only the system management card (SMC) powers up and checks the HEALTHY# register where it maintains the healthy status of all the cards in the system. The non-hotswappable card (or board) will assert the HEALTHY# signal to the SMC. Because the HEALTHY# pin is grounded in the non-hotswappable card (or board), the present embodiment uses this grounding as a way to determine whether any non-hotswappabe card is present in the system. If a non-hotswappable card is determined to be present in the system, the SMC will deassert the radial PCI reset (PCI_RST#) to the particular slot where the non-hotswappable card is present and initiate the power ON sequence to the system controller card. The system controller card (e.g., the host card) will generate the global reset and the REQ64# assertion at the time of power up (the REQ64# is asserted at the time when the global reset is de-asserted), which will configure the non-hotswappable card correctly (64-bit or 32-bit).

21 Claims, 14 Drawing Sheets

OTHER PUBLICATIONS

AF Intel; IPMI v1.5 Overview, 2001 Intel Corporation; pp. 1-4.

AG Intelligent Platform Management Interface; IPMI Specification Version 1.0 Available, http://developer.intel.com/design/servers/ipmi/spec.htm; Jul. 1, 2002; pp. 1-2.

AH PCI Industrial Computer Manufacturer Group (PICMG) Releases CompactPCI System Management Specification; Release Apr.'00, Apr. 18, 2000; http://www.picmgeu.org/press_releases/release_april.htm; pp. 1-3; Jul. 1, 2002.

AI CompactPCI Keeps Plugging Away; Special Report; CompactCPI Goes to Town, By: David B. Cotton; Jun. 2001; pp. 38, 40-43.

AJ CompactPCI: Here, There And (Almost) Everywhere; Special Report; CompactPCI Goes to Town, By: Jon Kenton and Dennis Liles; RTC Jun. 2001; pp. 48, 50, 52-53.

AK Bridging Beyond Eight Slots Part II: A Bridge Over Troubled Waters?; Special Report; CompactPCI Goes To Town, By: Tom Sutherland; Jun. 2001 RTC; pp. 57-61.

* cited by examiner

FIG. 6(a)

| PIN | Z | A | B | C | D | E | F | |
|-----|---|---|---|---|---|---|---|---|
| 22 | GND | XXX | XXX | XXX | XXX | XXX | GND | 404e |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | YYY | YYY | YYY | YYY | YYY | GND | |
| 22 | GND | XXX | XXX | XXX | XXX | XXX | GND | 404d |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | YYY | YYY | YYY | YYY | YYY | GND | |
| 3-19 | GND | XXX | XXX | XXX | XXX | XXX | GND | 404c |
| 2 | GND | YYY | YYY | YYY | YYY | YYY | GND | |
| 1 | GND | XXX | XXX | XXX | XXX | XXX | GND | |
| 22 | GND | GA4 | GA3 | GA2 | GA1 | GA0 | GND | 404b |
| 21 | GND | CLK6 | GND | RSV | RSV | RSV | GND | |
| 3-20 | GND | YYY | YYY | YYY | YYY | YYY | GND | |
| 2 | GND | CLK2 | CLK3 | SYSEN# | GNT2# | REQ3# | GND | |
| 1 | GND | CLK1 | GND | REQ1# | GNT1# | REQ2# | GND | |
| 16-22 | GND | YYY | YYY | YYY | YYY | YYY | GND | 404a |
| 15 | GND | 3.3v | FRAME# | IRDY# | BD_SELECT# | TRDY# | GND | |
| 6-14 | GND | YYY | YYY | YYY | YYY | YYY | GND | |
| 5 | GND | BRSVP1A5 | BRSVP1B5 | BD_RESET# | GND | GNT# | GND | |
| 4 | GND | BRSVP1B5 | BD_HEALTHY# | V(I/O) | INTP | INTS | GND | |
| 2-3 | GND | YYY | YYY | YYY | YYY | YYY | GND | |
| 1 | GND | 5v | -12v | TRST# | +12v | 5v | GND | |

| PIN | F | E | D | C | B | A | Z | |
|---|---|---|---|---|---|---|---|---|
| 22 | GND | XXX | XXX | XXX | XXX | XXX | GND | |
| 21 | GND | XXX | XXX | XXX | XXX | XXX | GND | 408e |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | YYY | XXX | YYY | XXX | YYY | GND | |
| 21 | GND | XXX | YYY | XXX | YYY | XXX | GND | 408d |
| 3-20 | GND | XXX | XXX | XXX | XXX | XXX | GND | |
| 2 | GND | YYY | YYY | XXX | XXX | YYY | GND | |
| 1 | GND | XXX | XXX | YYY | YYY | XXX | GND | |
| 3-19 | GND | XXX | XXX | XXX | XXX | XXX | GND | 408c |
| 2 | GND | XXX | XXX | XXX | XXX | XXX | GND | |
| 1 | GND | GA0 | GA1 | GA2 | GA3 | GA4 | GND | |
| 22 | GND | RSV | RSV | RSV | GND | CLK6 | GND | 408b |

406d

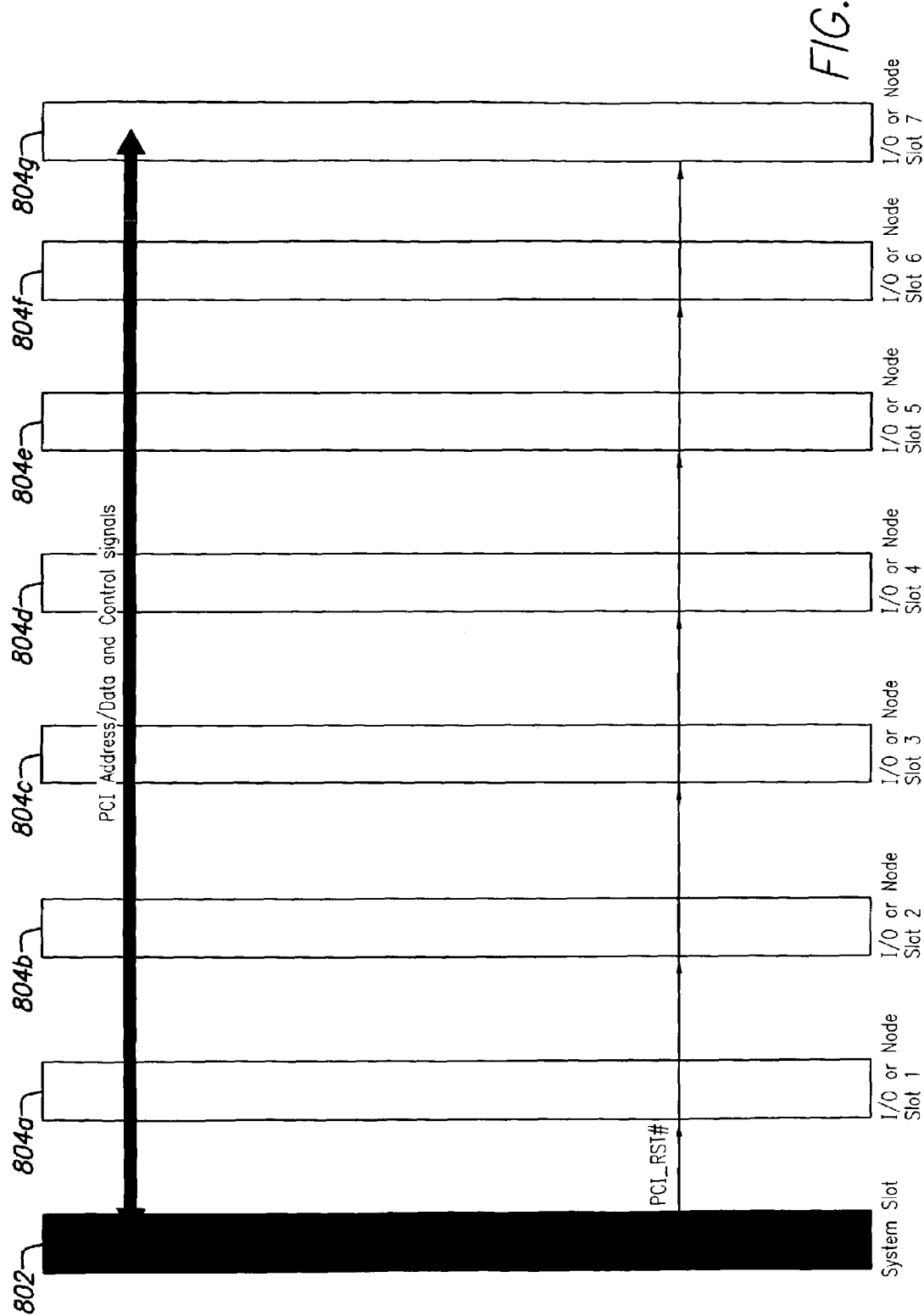

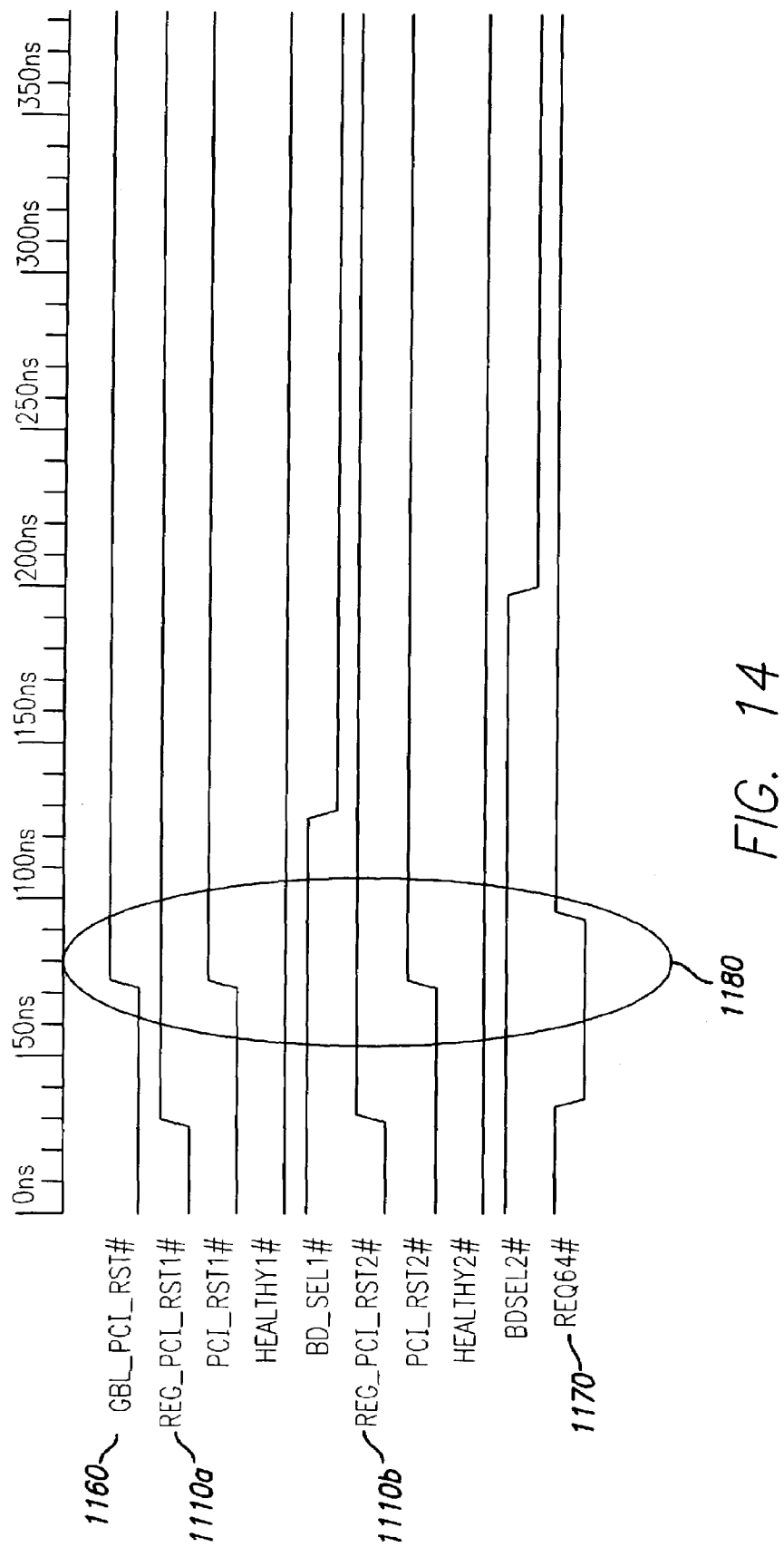

SUPPORTING NON-HOTSWAP 64-BIT CPCI CARDS IN A HA SYSTEM

BACKGROUND OF THE INVENTION

1. Field of the Invention

The present invention relates to a server system. More particularly, the present invention relates to methods and apparatus that are adapted for supporting a non-hotswap card connected with a Compact Peripheral Component Interconnect (CPCI) backplane.

2. Description of Related Art

Computers on a computing system can be categorized as two types: servers and clients. Those computers that provide services (e.g., Web Services) to other computers are servers (like JAVA servers or Mainframe servers); the computers that connect to and utilize those services are clients.

A server can be designed with a variety of implementations/architectures that are either defined within existing standards (for example the PCI Industrial Computer Manufactures Group or PICMG standards), or can be customized architectures.

Compact Peripheral Component Interconnect (CPCI) is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high speed computing, modular and robust packaging design, and long term manufacturer support. Because of its high speed and bandwidth, the CPCI bus is particularly well suited for many high speed data communication applications, such as for server applications.

Compared to a standard desktop PCI, CPCI supports twice as many PCI slots (typically 8 versus 4) and offers an ideal packaging scheme for industrial applications. Conventional CPCI cards are designed for front loading and removal from a card cage. The cards are firmly held in position by their connector, card guides on both sides, and a faceplate that solidly screws into the card cage. Cards are mounted vertically allowing for natural or forced air convection for cooling. Also, the pin-and-socket connector of the CPCI card is significantly more reliable and has better shock and vibration characteristics than the card edge connector of the standard PCI cards.

Conventional CPCI defines a backplane environment that is limited to eight slots. More specifically, the bus segment of the conventional CPCI system is limited to eight slots, which includes a CPCI system slot and a plurality of CPCI peripheral slots. The system slot provides the clocking, arbitration, configuration, and interrupt processing for up to seven peripheral slots. The newest trend in CPCI systems is to support hot swappable node and/or I/O cards on these CPCI slots. Hot swappability is the ability to unplug and plug a card and/or cards while the system remains on. In other words, hot swappability is the ability to exchange cards while the system is running so that there is no need to shut down and subsequently reboot the system. The PICMG Hot Swap/High Availability (HA) specification (e.g., PICMG 2.0 R3.0 or PICMG 2.1 R2.0), which allows the powering-up/down of the card by the hot swap controller, defines, among other things, that all CPCI slots are controlled individually with signals (e.g., lines or configuration signals) that control the insertion of a hot swappable card into a slot of the backplane. However, if a non-hot swappable card, which is not compliant to the Hot Swap/HA Specification, is inserted into a slot of the backplane, the signals of the conventional CPCI Hot Swap/HA system would not be able to support the non-compliant CPCI card. For example, when non-hot swappable front cards are present in the system, the signals (e.g., the reset signals) used by the hot swap controller to allow the power-up/down of the hot swappable front cards may cause system errors. Accordingly, it would be advantageous to provide a CPCI system that can reliably detect and support CPCI cards, whether hot swappable or not.

SUMMARY OF THE INVENTION

The present invention relates to a CPCI system that is adapted to reliably support a non-hotswap CPCI card in a hotswap system. The present invention may be used with a plurality of Compact Peripheral Component Interconnect (CPCI) slots in a hotswap system. The hotswap system is implemented with a dedicated reset signal and a global reset signal. The global reset signal is used to reset all the slots. The dedicated reset signal is used to control each of the CPCI slots. The dedicated reset signal may be from a system controller card on the hotswap system. In the context of the present invention, this dedicated reset signal can be referred to as a radial rest signal or a non-bussed reset signal. Typically, for any slot in the hotswap system to be out of reset, both the global reset signal and the radial set signal corresponding to the slot to be out of reset have to be de-asserted.

In a first embodiment of the present invention, a Compact Peripheral Component Interconnect (CPCI) system includes a circuit board, a slot, a system controller card, and a management card. The slot is located on the circuit board. The system controller card is coupled with the circuit board. The system controller card provides management and control functions to the CPCI system. The management card is coupled with the system controller card. The management card asserts a slot designated signal (e.g., a regular reset bit or a REG_PCI_RSTn# reset bit) via the slot to a front card inserted into the slot. The management card then determines whether the front card on the slot is non-hotswappable and if the front card is determined to be non-hotswappable, the management card de-asserts the slot designated reset signal to the front card (i.e., the management card de-asserts the REG_PCI_RSTn# reset bit corresponding to the front card). In addition, the slot in one embodiment may only be out of reset (i.e., a radial reset to the particular slot) if both a global reset signal and the slot designated reset signal, such as the REG_PCI_RSTn# bit, have been deasserted.

In a second embodiment of the present invention, the circuit board has a first slot and a second slot. The management card asserts a first radial reset signal via the first slot to a first front card on the first slot and a second radial reset signal via the second slot to a second front card on the second slot. The management card then determines whether the first front card is non-hotswappable and if the first front card is determined to be non-hotswappable, the management card de-asserts the first radial reset signal to the first front card. The management card may also determine whether the second front card is hotswappable and if the second front card is determined to be hotswappable, the management card continues to assert the second reset signal to the second front card.

In a third embodiment of the invention, a method is developed for supporting a non-hotswappable front card on a hotswappable CPCI system. The method includes a system controller card coupled with first and second front cards via a circuit board. The management and control functions for the first and second front cards are provided through the system controller. A management card is coupled with the system controller card. A first radial reset signal is asserted through the management card to the first front card. A second radial reset signal is asserted through the management card to the second front card. The management card determines whether the first front card is non-hotswappable and also determines whether the second front card is non-hotswappable. The management card de-asserts the first reset radial signal to the first front card if the first front card is determined to be non-hotswappable and continues to assert the second radial reset signal to the second front card if the second front card is hotswappable.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

FIG. 6(a) shows a front view of a pin out arrangement of the connectors of a slot;

FIG. 6(b) shows a back view of the pin out arrangement of the connectors of the slot of FIG. 6(a);

FIG. 7 is a block diagram that illustrates a typical non-HA hotswap chassis;

FIG. 14 is a waveform for two non-HA compatible cards in an HA chassis that supports non-HA compatible cards.

DETAILED DESCRIPTION

Figure 1:
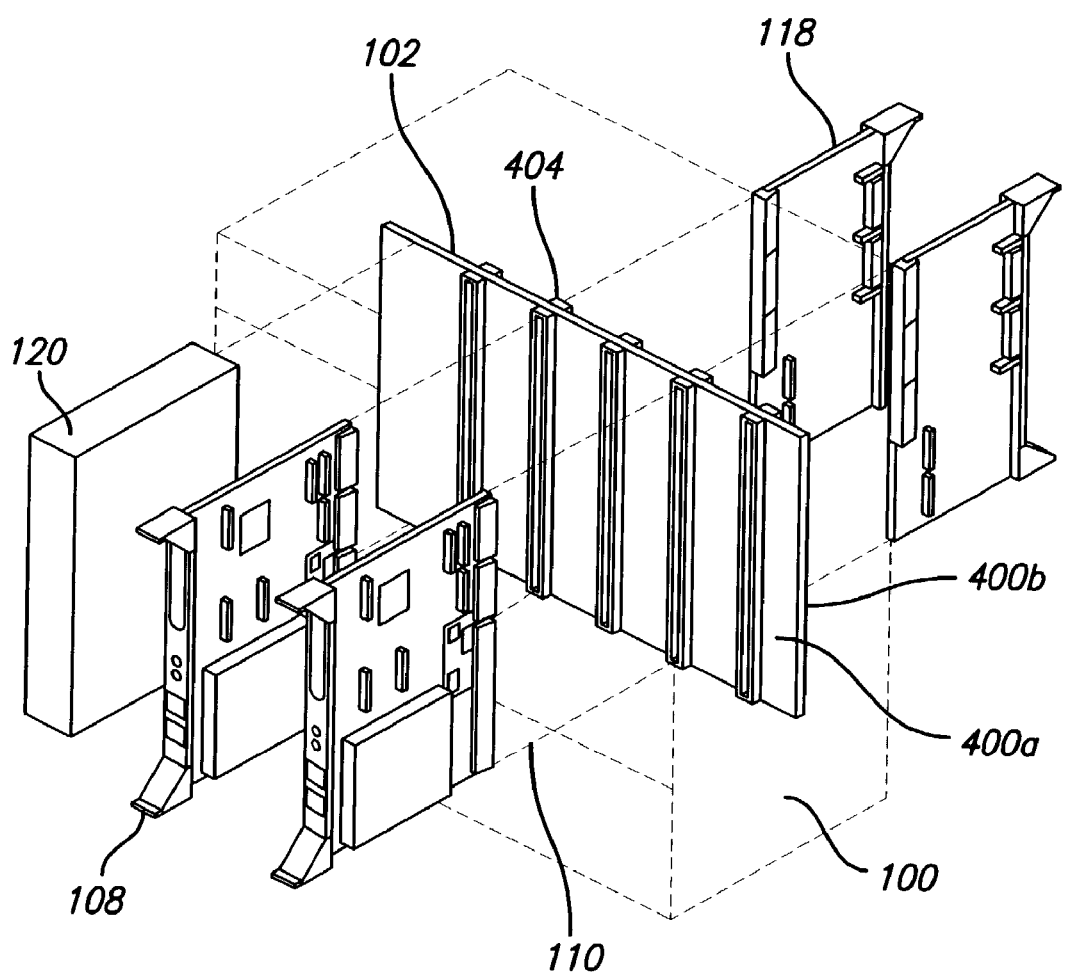
FIG. 1 is an exploded perspective view of a CPCI chassis system according to an embodiment of the invention.

The present invention is directed to methods and systems that are adapted to reliably detect and support CPCI cards, whether hot swappable or not. The CPCI chassis may support hotswappable and high availability (HA) features as per the PCI Industrial Computer Manufactures Group or PICMG specification (e.g., PICMG 2.1 R2.0, the Hotswap Specification). In the conventional CPCI chassis, the system controller card (e.g., the host card) is responsible for configuring the CPCI interfaces including the width of the CPCI interfaces (i.e., the width of the interfaces may be either 32-bit or 64-bit). The above system does not support non hotswappable (non-HA) 64-bit PCI cards (but may support a non-HA 32-bit CPCI card or a 64-bit hotswappable CPCI card). For example, a non-HA 64-bit CPCI card (node or I/O card) samples a 64-bit configuration signal, such as a REQ64# signal, during a reset signal deassertion, such as a PCI_RST# signal deassertion, to configure its CPCI interface as 32-bit or 64-bit per PCI specification(s). The system controller is required by the above system to assert the 64-bit configuration signal (REQ64# line) each time during each slot's radial reset signal (PCI_RST#) deassertion, and the slots inserted with non-Hot swap cards may cause system errors on the system because they may not support the 64-bit configuration signal (REQ64# signal) that is bussed across all of the CPCI slots and the radial signal (PCI_RST#) deassertion. Accordingly, embodiments of the present invention provide a method and apparatus to detect and support the non-hotswap 64-bit CPCI cards that are inserted into the HA CPCI chassis.

In one embodiment of the present invention, the CPCI slots are controlled by a plurality of control signals. For example, the control signals may comprise a global reset signal, such as GBL_PCI_RST#. This signal is generated by the system controller card and is gated with a radial reset signal, such as REG_PCI_RSTn# bits, on a management card. The management card generates the radial resets (the REG_PCI_RSTn# bits) to all the slots on the circuit board. The PCI_RSTn# is defined as the output signal generated from the GBL_PCI_RSTn# and REG_PCI_RSTn# signals (This is logical AND function of GBL_PCI_RSTn# and REG_PCI_RSTn# signals). If both the signals (GBL_PCI_RSTn# and REG_PCI_RSTn#) are deasserted (logic 1), the radial reset will be deasserted (logic 1). In addition, the control signals may also comprise HEALTHYn# signals, BD_SELn# signals, and REQ64# signals. Each of the HEALTHYn# signals is defined as an input signal to the management card that provides the healthy status for each of the CPCI front cards. Individually, each of these HEALTHYn# signals is a designated (or individual) signal from each and every front card on the CPCI system. The BD_SELn# signals output signals from the management card power cycle the individual front cards on the circuit board. Each of the REQ64# signals is bussed across all of the slots on the circuit board; this signal is asserted by the system controller card at the time of global reset deassertion to configure the 64 bit front cards. In addition, the CPCI slots are controlled by M64EN pins, REQ_Pin_PCI_Bridge, and REQ64 pins. The M64EN is a pin assigned on the backplane (the circuit board) in the HA Chasis to inform whether the circuit board supports a 64 bit access or not. This signal should only be used by HA front cards. The REQ64_Pin_PCI_Bridge is the REQ64 pin on the PCI Bridge on the front cards. This bridge is an OR function of the REQ64 and M64EN pins on the circuit board. This bridge should only be used in this way on HA hotswap cards.

In one embodiment of the present invention, the radial HA control signals (e.g., BD_SEL#, HEALTHY#, PCI_RST#) to the CPCI slots should be implemented separately on some other card (or board), such as a system management card (e.g., an alarm card). At the time of system powerup, only the system management card (SMC) powers up and checks the HEALTHY# register where it maintains the healthy status of all the cards in the system. The non-hotswap card (or board) will assert the HEALTHY# signal to the SMC. Because the HEALTHY# pin is grounded in the non-HA card (or board), the present embodiment uses this grounding as a way to determine whether a non-HA card is present in the system. If a non-HA card is determined to be present in the system, the SMC will deassert the radial PCI reset (PCI_RST#) to the particular slot where the non-HA card is present and it will initiate the power ON sequence to the system controller card. The system controller card (e.g., the host card) will generate the global reset and the REQ64# assertion at the time of power up (the REQ64# is asserted at the time when the global reset is de-asserted), which will configure the non-HA board correctly (64-bit or 32-bit).

In one embodiment of a present inventive system, a 64 bit configuration signal (e.g., a REQ64#) is asserted by a system controller card with the deassertion of global reset only if the present inventive system is 64 bit capable. The configuration signal is then bussed from the system controller card to all front cards on the present inventive system. The front cards use this configuration signal to determine whether to operate in the 32 bit mode or the 64 bit mode. If the present system is 64 bit capable, the front card configures itself into the 64 bit mode. If the present system is not 64 bit capable, the system controller card does not assert the 64 bit configuration signal to the front card at the time of global reset deassertion. In this case the front card configures itself into the 32 bit mode.

Referring to FIG. 1, there is shown an exploded perspective view of a CPCI chassis system as envisioned in an embodiment of the present invention. The chassis system 100 includes a CPCI circuit board referred to in the conventional CPCI system as a passive backplane (or centerplane) 102 since the circuit board is located at the back of the chassis 100 and front cards (e.g., motherboards) are inserted from the front of the chassis 100. The front side 400a of the backplane 102 has slots provided with connectors 404. A corresponding rear input/output (I/O) card (transition card) 118 is coupled to the front card 108 via backplane 102. The backplane 102 contains corresponding slots and connectors (not shown) on its backside 400b to mate with transition card 118. In the chassis system 100 that is shown, a front card 108 may be inserted into appropriate slots and mated with the connectors 404. For proper insertion of the front card 108 into the slot, card guides 110 are provided. This CPCI chassis system 100 provides front removable front cards (e.g., front motherboards or front I/O cards) and unobstructed cooling across the entire set of front cards. The backplane 102 is also connected to a power supply 120 that supplies power to the CPCI system.

Figure 2:
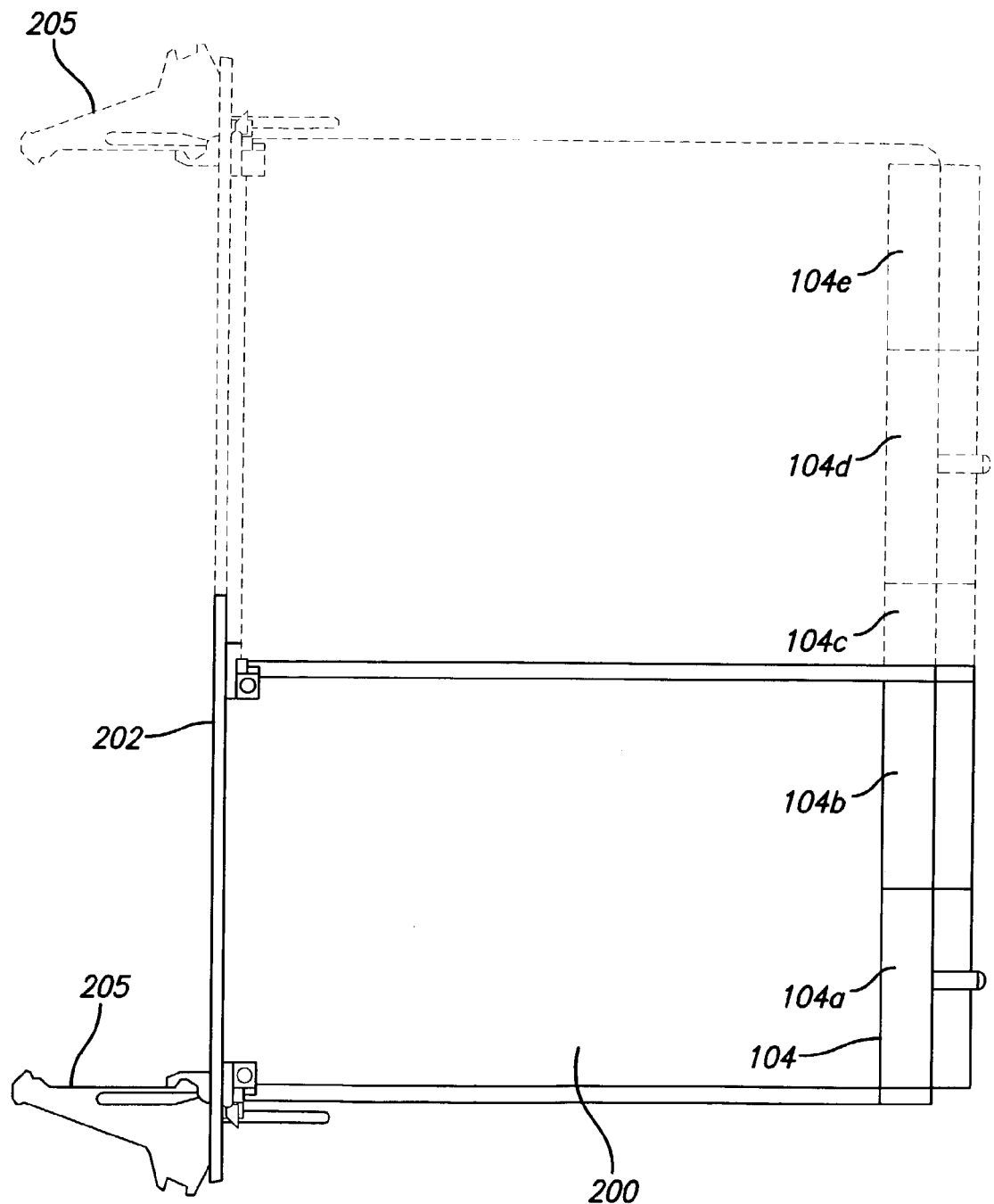
FIG. 2 shows the form factors that are defined for the CPCI front card.

Referring to FIG. 2, there are shown the form factors defined for the CPCI front card (e.g., motherboard), which is based on the PICMG CPCI industry standard (e.g., the standard in the PICMG 2.0 CPCI specification). As shown in FIG. 2, the front card 200 has a front plate interface 202 and ejector/injector handles 205. The front plate interface 202 is consistent with PICMG CPCI packaging and is compliant with IEEE 1101.1 or IEEE 1101.10. The ejector/injector handles should also be compliant with IEEE 1101.1. Two ejector/injector handles 205 are used for the 6U front cards in the present invention. The connectors 104a–104e of the front card 200 are numbered starting from the bottom connector 104a, and the 6U front card size is defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b and is the minimum as it accommodates the full 64 bit CPCI bus. Specifically, the 104a connectors are reserved to carry the signals required to support the 32-bit PCI bus; hence no other signals may be carried in any of the pins of this connector. Optionally, the 104a connectors may have a reserved key area that can be provided with a connector "key," which may be a pluggable piece (e.g., a pluggable plastic piece) that comes in different shapes and sizes, to restrict the add-on card to mate with an appropriately keyed slot. The 104b connectors are defined to facilitate 64-bit transfers or for rear panel I/O in the 3U form factor. The 104c–104e connectors are available for 6U systems as also shown in FIG. 2. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all of the connectors 104a–104e, but only the signal-pin assignments for certain connectors are defined (e.g., the CPCI bus portion 104a and 104b are defined). The remaining connectors are the subjects of additional specification efforts or can be user defined for specific applications, as described above.

Figure 3:
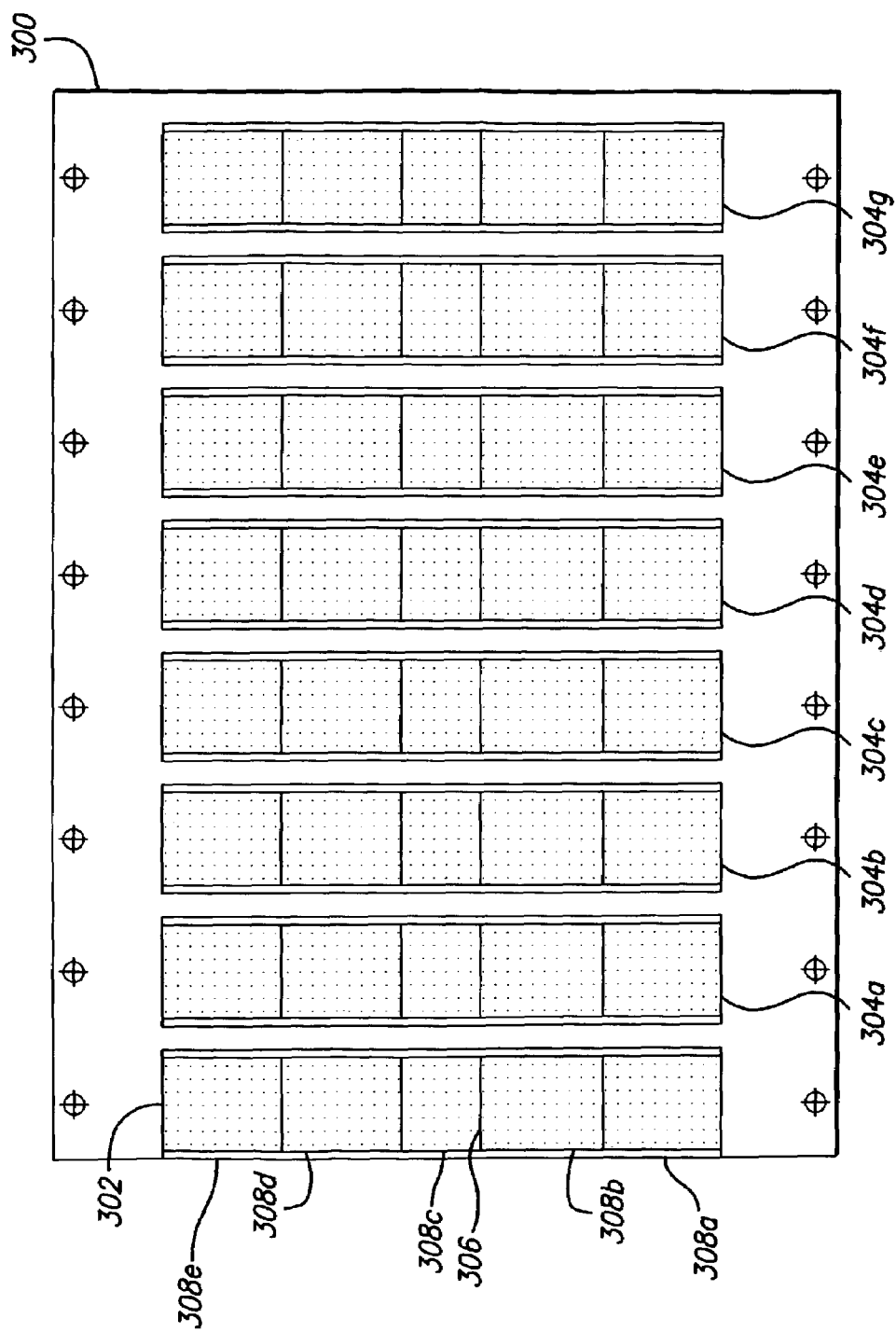
FIG. 3 is a front view of a backplane having eight slots with five connectors each.

Referring to FIG. 3, there is shown a front view of a 6U backplane having eight slots. A CPCI system includes one or more CPCI bus segments, where each bus segment typically includes up to eight CPCI card slots. Each CPCI bus segment includes at least one system slot 302 and up to seven peripheral slots 304a–304g. The CPCI front card for the system slot 302 provides arbitration, clock distribution, and reset functions for the CPCI peripheral cards on the bus segment. The peripheral slots 304a–304g may contain simple cards, intelligent slaves and/or PCI bus masters.

The connectors 308a–308e have connector-pins 306 that project in a direction perpendicular to the backplane 300. The connector-pins 306 are designed to mate with the front side "active" cards ("front cards") and "pass-through" their relevant interconnect signals to mate with the rear side "passive" input/output (I/O) card(s) ("rear transition cards"). In other words, in the conventional CPCI system, the connector-pins 306 allow the interconnected signals to pass-through from the front cards to the rear transition cards.

Figure 4B:
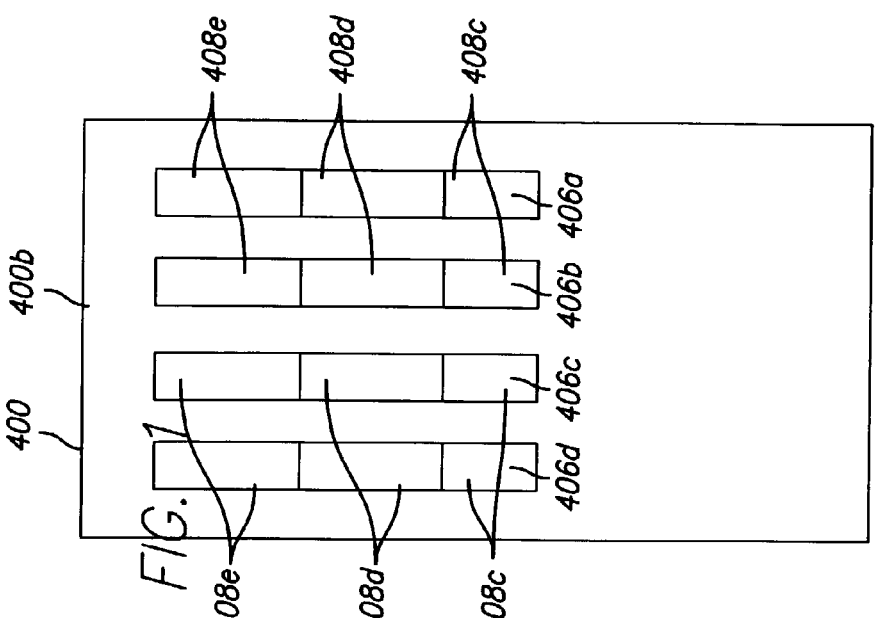
FIG. 4(b) shows a back view of the backplane of FIG. 4(a)
Figure 4A:
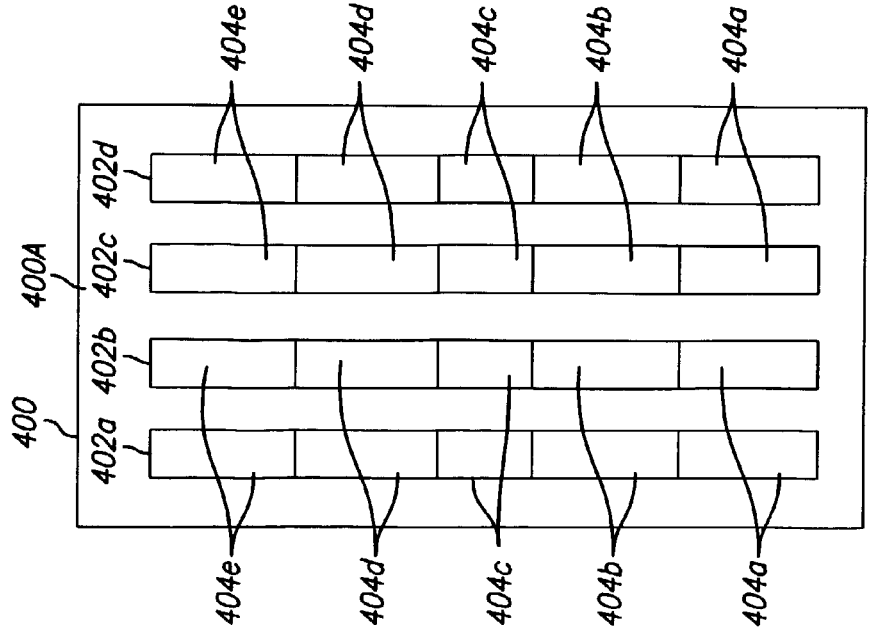
FIG. 4(a) shows a front view of another CPCI backplane.

Referring to FIGS. 4(a) and 4(b), there are shown respectively a front and back view of a CPCI backplane in another 6U form factor embodiment. In FIG. 5(a), four slots 402a–402g are provided on the front side 400a of the backplane 400. In FIG. 5(b), four slots 406a–406g are provided on the back side 400b of the backplane 400. Note that in both FIGS. 4(a) and 4(b) four slots are shown instead of eight slots as in FIG. 3. Further, it is important to note that each of the slots 402a–402d on the front side 400a has five connectors 404a–404e while each of the slots 406a–406d on the back side 400b has three connectors 408c–408e. This is because the 404a connectors are provided for 32 bit PCI and connector keying and the 404b connectors are typically only for I/O in the 3U form factor. Thus, in the 6U form factor they do not typically have I/O connectors to their rear. Accordingly, the front cards that are inserted in the front side slots 402a–402d only transmit signals to the rear transition cards that are inserted in the back side slots 406a–406d through front side connectors 404c–404e.

Figure 5:
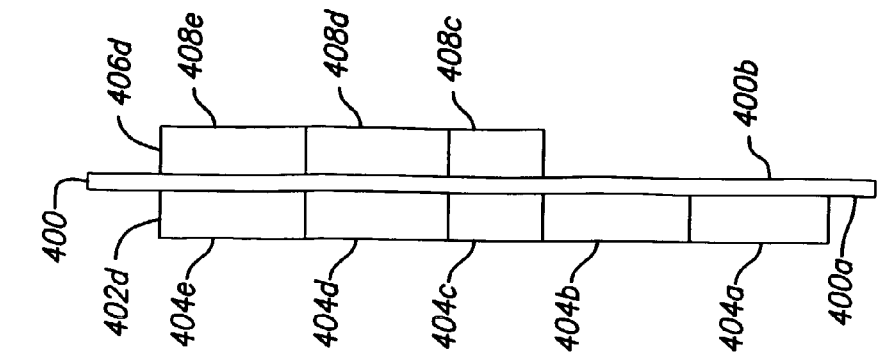
FIG. 5 shows a side view of the backplane of FIGS. 4(a) and 4(b)

Referring to FIG. 5, there is shown a side view of the backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404c–404e are arranged back-to-back with the back side connectors 408c–408e. Note that the front side connector 404a–404b does not have a corresponding back side connector. It is important to note that the system slot 402a is adapted to receive the front card having a CPU; the signals from the system slot 402a are then transmitted to corresponding connector-pins of the peripheral slots 402b–402d. Thus, the preferred CPCI system can have expanded I/O functionality by adding peripheral front cards in the peripheral slots 402b–402d.

FIGS. 6(a) and 6(b) illustrate a pin out arrangement of the connectors in a CPCI system. Specifically, FIG. 6(a) shows a front view of a conventional pin out arrangement of the connectors of a slot. Referring to FIG. 6(a), there are shown connectors 404a–404e of slot 402d. The connector-pins are arranged in a column and row configuration. Each of the connectors 404a–404e has seven columns of pins, which are designated as Z, A, B, C, D, E, and F going from left to right. Each of the connectors 404a–b and 404d–e also has twenty-two rows of connector-pins. Connector 404c has nineteen rows of connector-pins.

As shown in FIG. 6(a), all of the connector-pins in the Z and F columns are connected to a ground layer GND in the backplane. The connector-pins of the other columns A, B, C, D, and E are connected to various other signals including ground. Note that in FIG. 6(a), the connector-pins having XXX or YYY designations do not mean that those pins share the same signals, respectively. Instead, the XXX or YYY designations are provided to show that these connector-pins are defined to carry various signals, including CPCI signals, that are not particularly relevant to the present invention, and thus are not specifically shown in FIG. 6(a). Note that only connectors 404a–404c carry CPCI signals. Note also that the other slots 402a–402c have a similar pin out arrangement as shown in slot 402d of FIG. 6(a).

FIG. 6(b) shows a back view of a pin out arrangement of the connectors of a slot. Referring to FIG. 6(b), there are shown connectors 408c–408e of slot 406d. Note that the back view shows three connectors instead of five. This is because, as shown in FIGS. 4(a) and 4(b), the front side of the backplane has five connectors while the back side of the backplane has three connectors. Further, the column arrangement of the connector-pins is designated as F, E, D, C, B, A, and Z going from left to right. This is because the connector-pins of slots 402d and 406d are straight-pass through pins, and so the column designations are mirror images with respect to each other. For example, the connector-pin located at column A, row 2 of connector 404c is the same connector-pin located at column A, row 2 of connector 408c. Also, similar to FIG. 6(a), connector-pins located at columns F and Z in FIG. 6(b) are connected to a ground layer GND in the backplane. Likewise, connector-pins of columns A, B, C, D, and E are connected to various signals, as shown in FIG. 6(a).

More specifically, the Hot Swap/HA specification defines the connector-pin located at column D, row 15 of connector 404(a) to be a BD_SELECT# pin. Other relevant connector-pins of connector 404a include a BD_HEALTHY# pin, which is located at column B, row 4, and a BD_RESET# pin, which is located at column C, row 5.

As previously stated, embodiments of the present invention are applicable in a Compact Peripheral Component Interconnect (CPCI) chassis that can support non-HA 64-bit CPCI cards inserted into the node and/or I/O slots of the CPCI chassis. Thus, the present invention allows the use of existing legacy 64-bit non-HA CPCI cards.

Embodiments of the present invention are applicable to existing legacy non-HA CPCI cards that are compliant with a legacy or an initial PCI Industrial Computer Manufactures Group (PICMG) specification (e.g., PICMG 2.0 R1.0). Referring now to FIG. 7, the PICMG committee derived the initial CPCI specification (PICMG 2.0 R1.0) with no support for HA hotswap. There is no signal defined for HA power control (BD_SEL#) and Healthy Status (HEALTHY#). The PCI_RST# is a bussed reset signal from the system controller (Note: this reset signal is not a radial reset to an individual slot). As soon as the system slot 802 powers up (i.e., the controller card inserted into the system slot powers up) all of the cards in the I/O or node slots 804a–804g are powered up. The system controller card (or board) promptly asserts the REQ64# at the time of PCI_RST# deassertion. So, all of the I/O and/or node slots 804a–804g of the CPCI interface (e.g., on the CPCI backplane) are simultaneously and accurately configured. Thus, there is no issue of supporting non-HA hotswap 64-bit cards in the PICMG 2.0 R1.0 compliant chassis. However, referring now to FIGS. 8 and 9, due to the demand for availability of the systems in service, the PICMG Committee defined the HA hotswap specification (PICMG 2.1 R1.0 and/or PICMG 2.1 R2.0). The PICMG 2.1 R2.0 specification added some modification to the PICMG core specification 2.1 R1.0 to incorporate the HA hotswap feature. The bussed reset signal, PCI_RST#, was changed to a radial signal (e.g., 910a, 910b, 910c, 910d, 910e, 910f, 910g, 1010a, 1010b, 1010c, 1010d, 1010e, 1010f, or 1010g) from the system controller slot 902, 1002. In addition, the PICMG added power control signals 920a–920g (e.g., BD_SELn#, e.g., BD_SEL1#, BD_SEL2#, etc.) for power control of each of the slots 904a–904g and added health signals 930a–930g (e.g., HEALTHYn#, e.g., HEALTH1#, HEALTH2#, etc.) to know the health of each of the cards (or boards) on each of the slots 904a–904g. All these signals are defined as radial signals from the system slot 902, 1002 (i.e., from the system controller card on the system slot 902, 1002).

Figure 9:
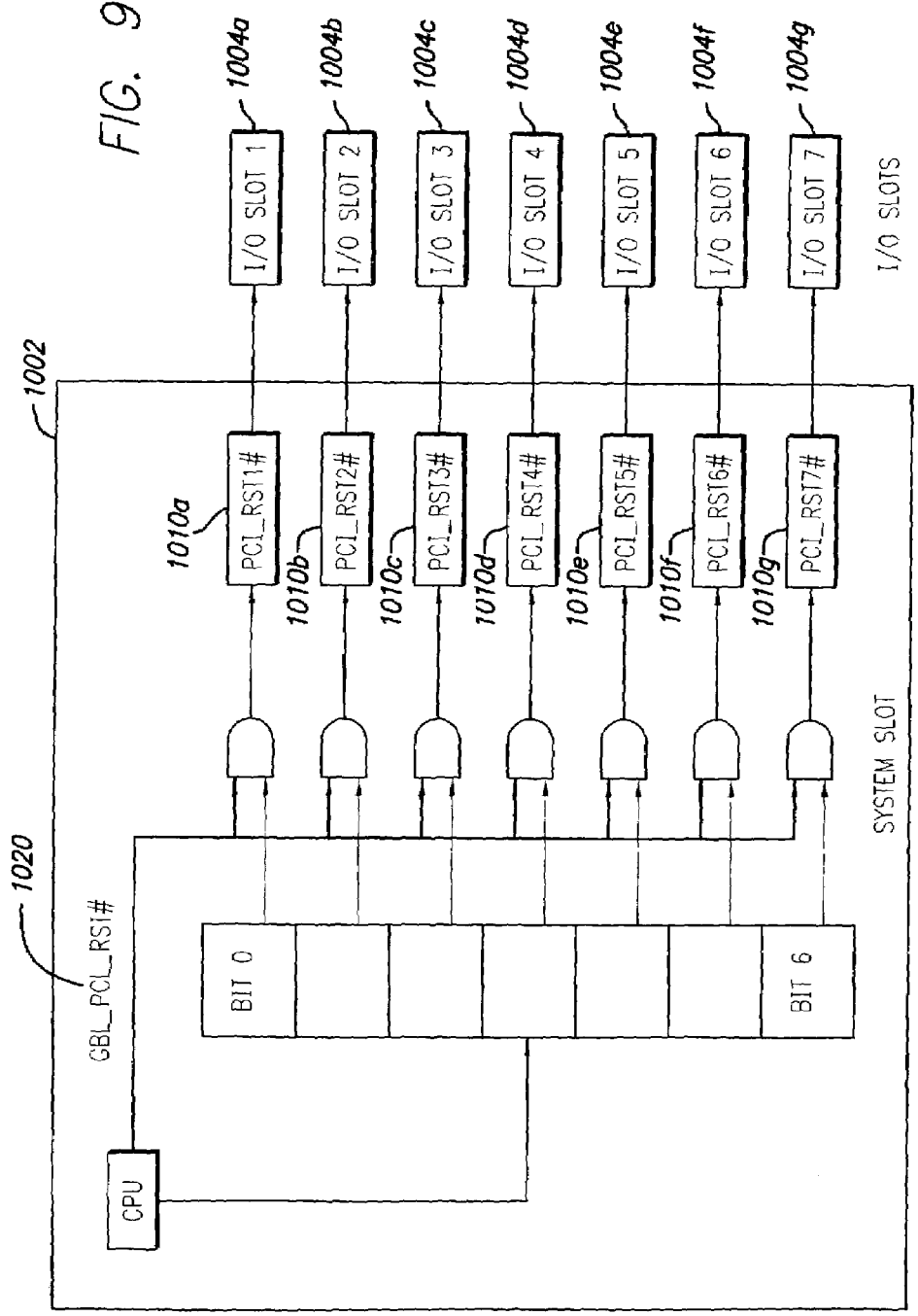
FIG. 9 is a block diagram that illustrates another CPCI HA chassis.

Referring now only to FIG., 9, the "radial reset" signal may be defined as a dedicated reset signal from System Controller Card (in one embodiment of the present invention, it is from the System Management Card rather than from the System Controller card) to each individual slot (non bussed reset signals). For example, a plurality of radial reset signals (1010a, 1010b . . . 1010g) are illustrated in FIG. 9. The "global reset" reset signal may be defined as a signal which can reset all the slots. On FIG. 9, the reset signal 1020 which is common to all the logic gates is the global reset signal. That is, the PCI_RSTn# signals (1010a, 1010b . . . 1010g) are the "radial reset" signals and the GBL_PCI_RST# signal 1020 is the "global reset" signal. For any slot (1004a, 1004b, 1004c, 1004d, 1004e, 1004f, or 1004g) to be out of reset (i.e., a radial reset to any particular slot), both the global reset signal 1020 and a slot designated reset bit, such as a REG_PCI_RSTn# bit (Bit 0 . . . Bit 6) have to be deasserted.

Figure 8:
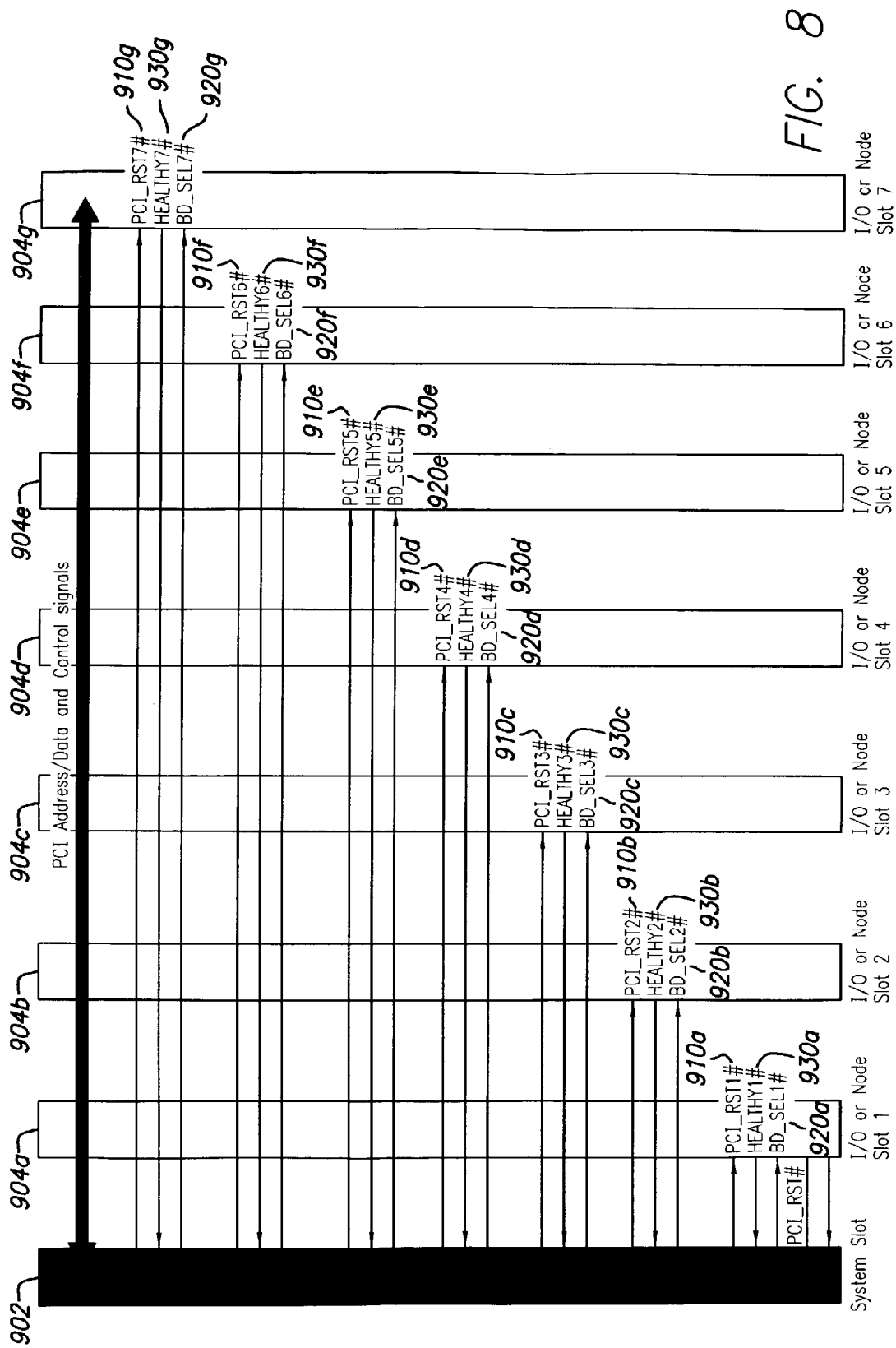
FIG. 8 is a block diagram that illustrates a typical CPCI HA chassis.

Referring now also to FIG. 8, typically the system controller card (e.g., the host card of the CPCI chassis) is the unit that is responsible for all of the system management and control functions. The system controller card implements all of the HA hotswap control functions, for example, controlling the power to each slot (e.g., 904 or 1004) by toggling BD_SELn# signal, resetting the slot (e.g., 904 or 1004) using PCI_RSTn# and maintaining the status of the slot (e.g., 904 or 1004) by reading HEALTHYn# signal from the particular slot (e.g., 904 or 1004). All of these signals are radially coupled from the system controller slot 902, 1002 to all other I/O or node slots (e.g., 904a–904g or 1004a–1004h) of the CPCI chassis. All of the PCI signals are bussed in through the CPCI backplane (or midplane).

In one embodiment of the present invention, the system control functions are implemented in a separate card or board, such as a system management card (SMC) managing control over the system controller and providing redundancy, if required. In this type of configuration, the SMC is powered ON when the chassis is powered ON. All of the other I/O or node and system controller slots are not powered ON until the SMC decides to power them on. All of the slots are controlled by the SMC, which powers them ON or OFF by asserting or deasserting the BD_SELn# signal. In other words, the SMC keeps all of the slots in the chassis in an unpowered condition and reset condition until the system management card successfully has initialized itself.

As per the PICMG core specification 2.0 R3.0 and HA hotswap specification PICMG 2.1 R2.0, the resets to each I/O are defined as below.

1. The system slot will have global PCI reset (GBL_PCI_RST#) and programmable PCI reset (REG_PCI_RSTn#) bits (using Register or GPIO pins of the CPU).
2. The radial PCI reset (PCI_RSTn#) to the slot is the logic AND function of (GBL_PCI_RST#) & (REG_PCI_RSTn#).
3. The REG_PCI_RSTn# is "zero" by default when the system is powered up. During system slot powerup, the global PCI reset (GBL_PCI_RST#) will be active for some time and the REQ64# will be in asserted condition at the deassertion time of global PCI reset (GBL_PCI_RST#).
4. But radial PCI resets to the slots are active even after deassertion of the global PCI reset (GBL_PCI_RST#) since programmable PCI reset bits (REG_PCI_RSTn#) are "zero."

After the successful initialization of the SMC, it powers ON each slot one by one. The sequence is as follows.

1. Assert the BD_SELn# to nth slot.
2. Read the HEALTHYn# status of the slot.
3. Deassert the reset PCI_RSTn# to that particular slot.

The similar sequence will happen to other slots. The sequence is followed so only the healthy cards will be included in the CPCI interface; the CPCI cards (or board) which are not healthy will be returned to power down mode.

Figure 11:
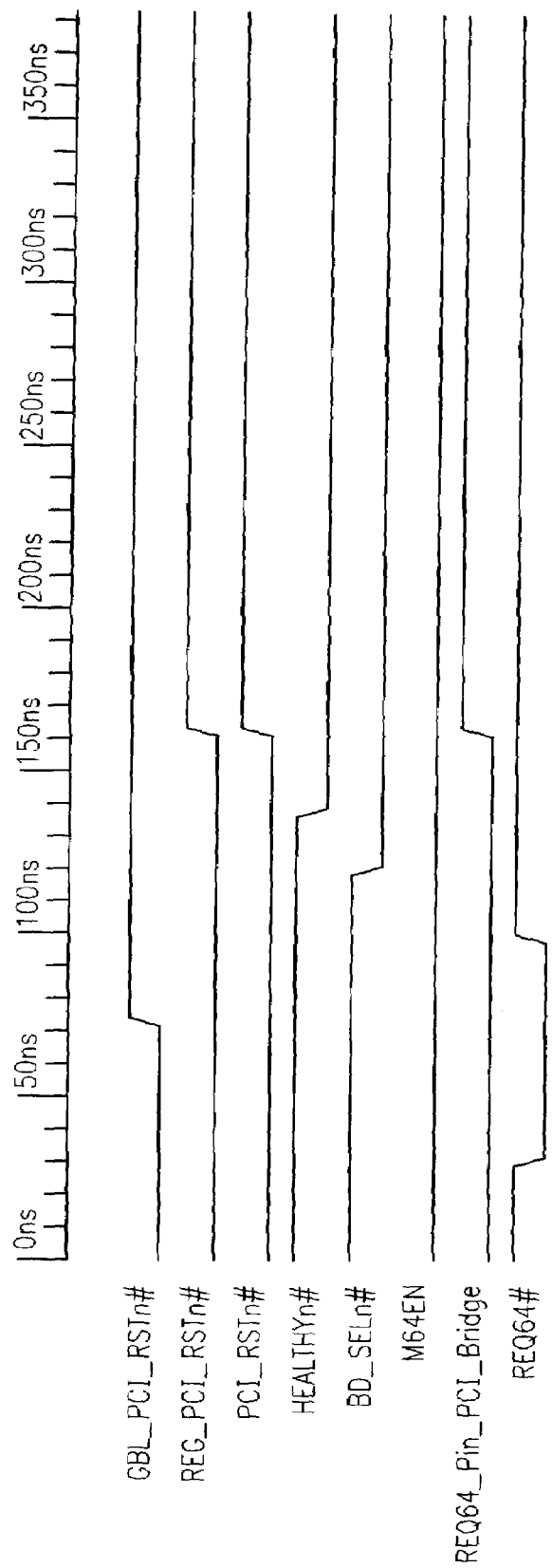
FIG. 11 is a waveform for an HA compatible card in a typical HA chassis.
Figure 12:
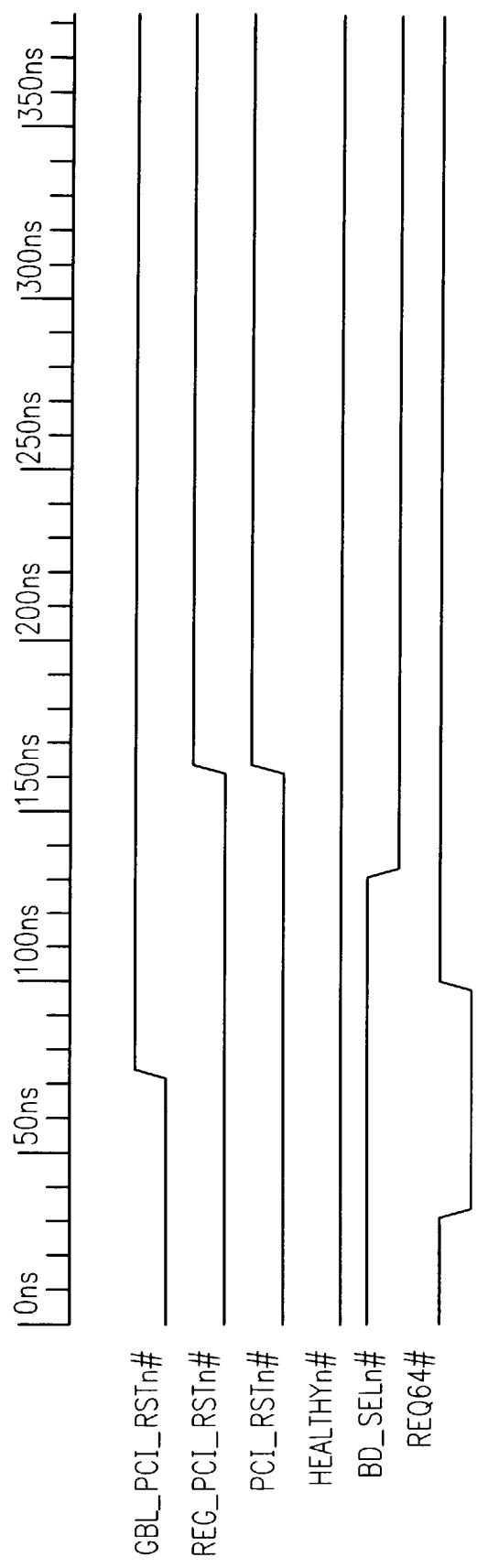
FIG. 12 is a waveform for a non-HA compatible card in an HA chassis.
Figure 13:
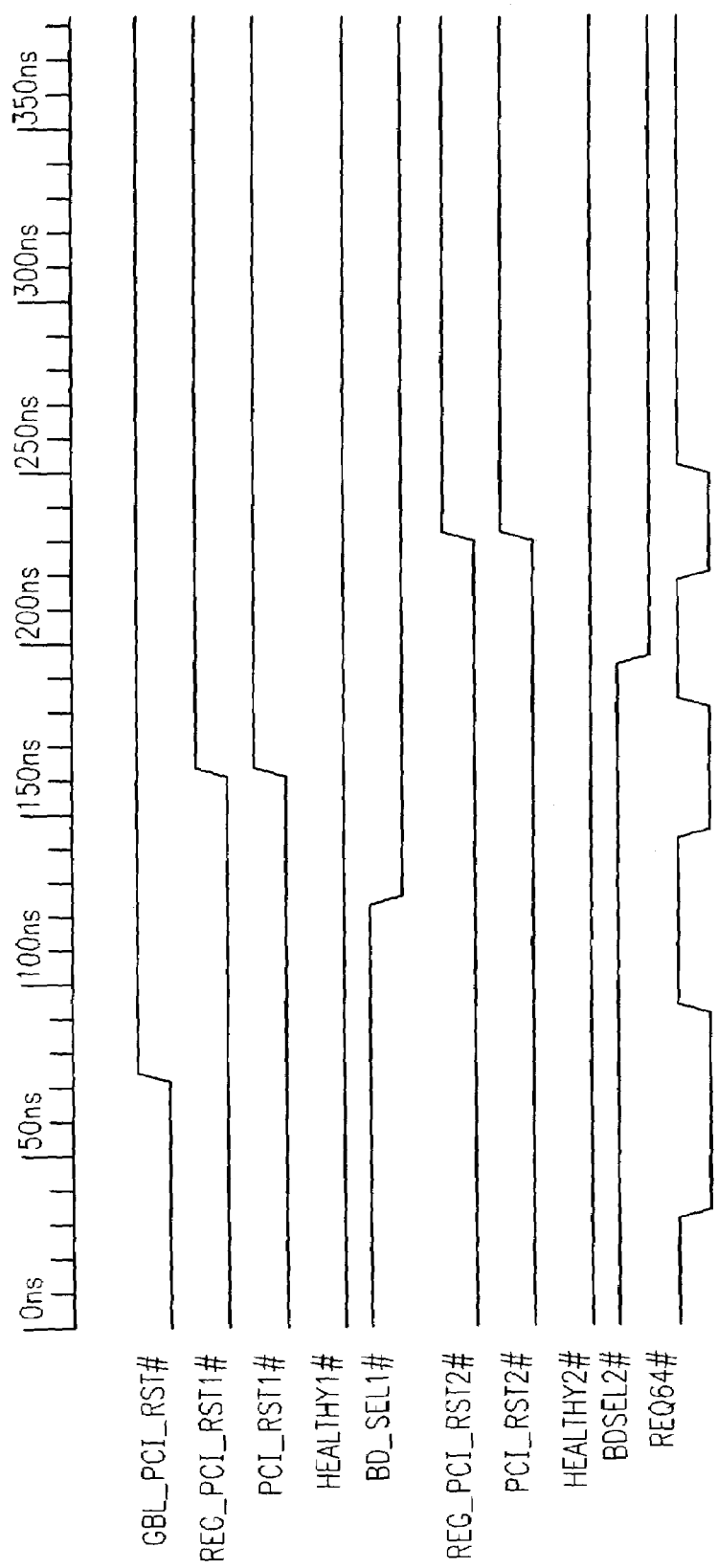
FIG. 13 is a waveform for two non-HA compatible cards in a typical HA chassis.

Referring now to FIGS. 11–13, as per the PCI specification, any 64-bit PCI device sampling REQ64# pin (REQ64_Pin_PCL_Bridge) at the time of PCI_RSTn# (PCI signal) deassertion to configure its interface as either 32-bit or 64-bit wide. In a CPCI chassis, the system controller card is required to assert the REQ64# line during each radial PCI_RSTn# deassertion, which will cause system errors since the REQ64# is a bussed signal across all the CPCI slots (i.e., if any PCI transaction is happening between any other slots, inadvertent operations may occur when the system controller card asserts REQ64#).

The PICMG 2.1 R2.0 specification defines the way to support the HA hotswap 64-bit cards in the CPCI chassis. The PICMG 2.1 R 2.0 hotswap specification defines the pin M64EN# in the backplane to take care of these issues. Thus, the HA hotswap CPCI card (or board) will use the M64EN# to configure the CPCI interface correctly. However, these special pin assignments are not present in non-HA CPCI cards (or boards). The PICMG 2.1 R 2.0 specification also does not specify support of non-hotswap 64-bit cards (or boards) in a CPCI HA chassis.

Referring now specifically only to FIG. 11, a waveform (or timing diagram) for a HA compatible card (or board) in an HA chassis is illustrated. The system controller card (or board) for the HA chassis asserts the REQ64 signal along with the Global Reset signal according to the CPCI specification. The signal to the REQ64 pin on the CPCI (or PCI) bridge of the HA boards in the I/O slots is a function of the REQ64.

Referring now specifically only to FIG. 12, this waveform considers a non-HA compatible card (or board) in a HA chassis. The non-HA compatible card is configured as 32 bit because REQ64 is not asserted at the time of PCI_RSTn# deassertion.

Referring now only to FIG. 13, this waveform illustrates that, according to CPCI specification, the REQ64 is asserted and slot 1 is configured correctly. However, the assertion of REQ64 could affect the card in slot 2, which may cause system errors.

Figure 10:
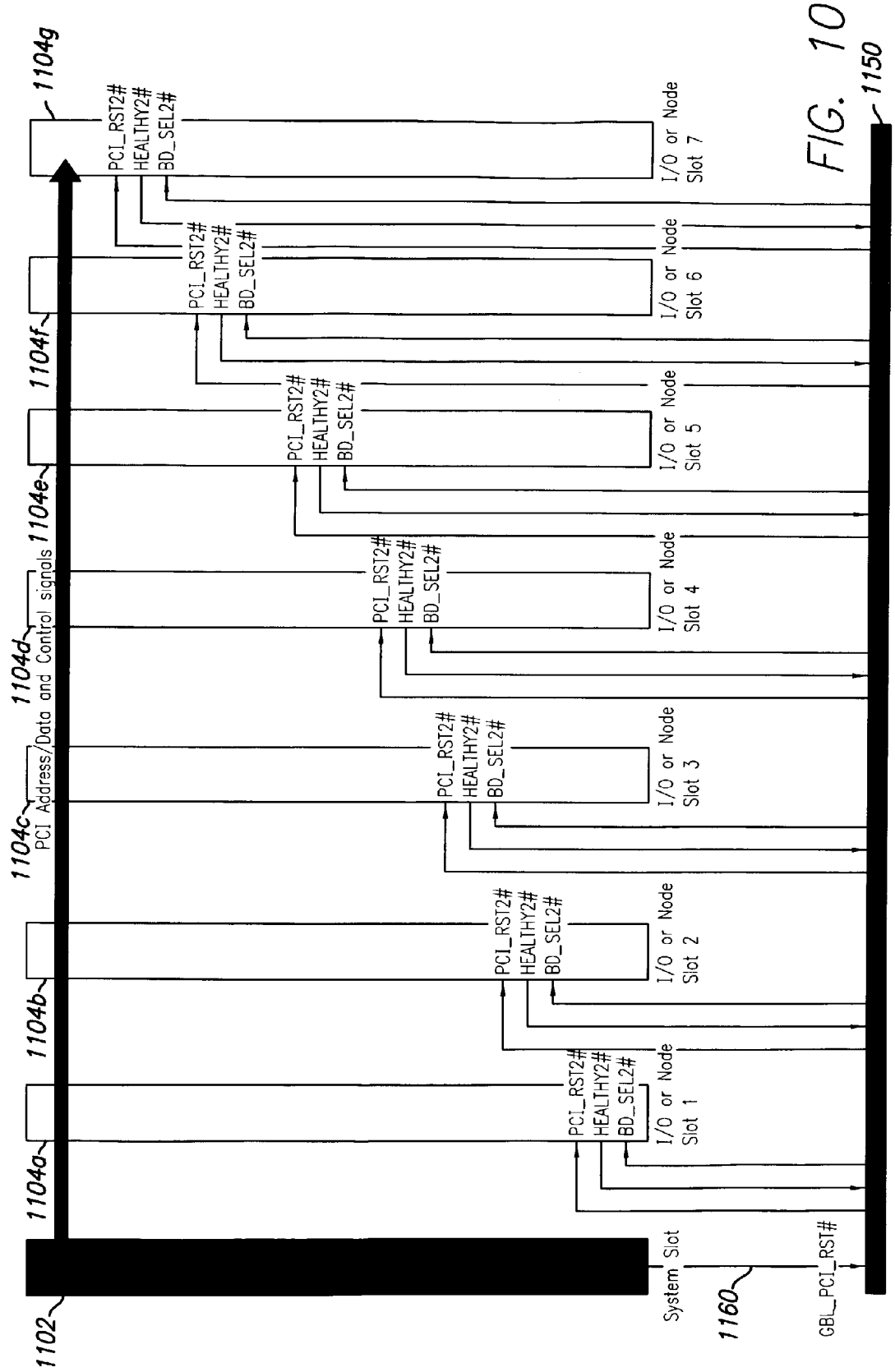
FIG. 10 is a block diagram that illustrates a CPCI HA chassis that supports non-HA cards according to an embodiment of the present invention.

Referring now to FIG. 10, embodiments of the present invention provide methods and/or apparatus to support non-HA 64-bit CPCI cards in an HA CPCI chassis where the system controller functions are implemented through a separate card 1150, such as an SMC (e.g., an alarm card in a CPCI chassis).

In one embodiment of the present invention, a CPCI system may have either eight CPCI slots or five CPCI slots. The CPCI system (or drawer) also have an alarm card (or SMC) and a host CPU card (or system controller card). The alarm card occupies a first CPCI slot of the CPCI system (e.g., slot 8 in the eight CPCI slots embodiment and slot 1 in the five CPCI slots embodiment) and the host CPU card occupies a second CPCI slot of the CPCI system (e.g., slot 1 in the eight slots embodiment and slot 3 in the five slots embodiment). The rest of the CPCI slots of the CPCI system can be populated with I/O cards or satellite CPU cards. For example, the eight CPCI slots embodiment may have one alarm card, one host CPU card, and six satellite CPU cards. The HA hotswap control functions are implemented within, though and/or by, a separate management card or board (e.g., the alarm card or SMC). This separate management card or board (e.g., 1150 in FIG. 10) is to be powered on by standby power to insure this is the first control card 1150 to power ON when the system is powered ON. All of the slots (e.g., 1102 and 1104a–1104g) are in powered down mode by default. This powered down mode by default is designed into the separate management card (e.g., the alarm card) of the present invention (e.g., in one embodiment of the present invention, the separate management card 1150 is designed so that all of the slots are in the powered down mode by default).

Referring now back to FIG. 10, a BD_SEL control signal is added to the system controller slot 1102 (for the system controller or host card) and it also is implemented in the design of the system controller card (e.g., it is implemented in the CPCI system's midplane and the controller card of the CPCI system).

Referring still to FIG. 10, when the chassis is powered ON, the separate or alarm card 1150 (the SMC) will be powered ON first and then, the separate or alarm card 1150 restricts all other boards (e.g., the I/O and System controller, such as the host card) in the power down/reset mode. But, the non-HA hotswap card (or board) will be powered ON immediately as it does not have any power control logic (using control signal BD_SELn#). Also, the HEALTHY#n pin is grounded in the non-HA hotswap card (or board).

As soon as the separate or alarm card 1150 is powered ON, a central processing unit for (or on) the separate or alarm card 1150 will read the HEALTHYn# register and interpret whether a non-HA hotswap card is present (e.g., the HEALTHYn# bit is zero when any non-HA hotswap card is present). This logic is valid until it starts to power up the slots 1104.

Referring now also to FIG. 14, the separate or alarm card 1150 will then determine the node and/or I/O slot 1104 where the non-HA hotswap card and/or cards are present (e.g., the slot numbers are mapped with HEALTHYn# bits); it deasserts the radial PCI reset bits 1110a, 1110b to the mapped slots 1104 (i.e., the non-HA hotswap board present slots 1104). After the deassertion, the radial resets to the non-HA hotswap card slots 1104 are now dependent on (or can only be reset by) the global PCI reset signal 1160 (GBL_PCI_RST#). In addition, the separate or alarm card 1150 then powers on each of the slots 1104 in the system (or the system slot) by asserting a radial BD_SELn# signal to each of the slots 1104 in the system (or the system slot). Each of the slots 1104 in the system (or the system slot) is then powered up, and the REQ64# signal 1170 is asserted. The REQ64# signal 1170 is asserted at the time 1180 of (or during) the global PCI reset signal 1160 (GBL_PCI_RST#) deassertion. Thus, in this embodiment of the present invention, all the non-HA hotswap cards which are present in the HA CPCI chassis are configured correctly.

Referring now specifically to FIG. 14, this waveform considers two non-HA cards (or boards) that are plugged into an HA chassis of an embodiment of the present invention. The regular reset signals 1110a, 1110b (e.g., the REG_PCI_RSTn# signals) to these non-HA cards are de-asserted as soon as it is determined (e.g., at time 1180) that these cards are non-HA cards. Thus, once the embodiment of the present invention determines that a non-HA card is present and determines its location, the embodiment may configure this non-HA card correctly on its HA chassis.

Having thus described embodiments of the present invention, it should be apparent to those skilled in the art that certain advantages of the described system have been achieved. It should also be appreciated that various modifications, adaptations, and alternative embodiments thereof may be made within the scope and spirit of the present invention. For example, a system comprising a plurality of CPCI front cards has been illustrated, but it should be apparent that the inventive concepts described above would be equally applicable to other types of card arrangements, buses, motherboards, and computer systems. The invention is further defined by the following claims.

What is claimed is:

1. A Compact Peripheral Component Interconnect (CPCI) system comprising:
   a circuit board;
   a slot on said circuit board;
   a system controller card coupled with said circuit board, said system controller card providing management and control functions; and
   a management card coupled with said system controller card;
   wherein said management card asserts a designated reset signal via said slot to a front card inserted onto said slot;
   wherein said management card determines whether said front card on said slot is non-hotswappable; and
   wherein said management card de-asserts said designated reset signal to said front card if said front card is determined to be non-hotswappable.

2. The CPCI system of claim 1, wherein said system controller card asserts a configuration signal and a global reset signal to said front card.

3. The CPCI system of claim 2, wherein said management card asserts a power signal via said slot to said front card and wherein said power signal is used to power on said front card.

4. The CPCI system of claim 2, wherein said configuration signal determines if said front card is a 64 bit front card.

5. The CPCI system of claim 4, wherein said configuration signal is asserted when said global reset signal is de-asserted.

6. The CPCI system of claim 1, wherein said management card determines whether said front card is non-hotswappable by interpreting a health signal for said front card.

7. The CPCI system of claim 1, wherein said front card comprises a pin for delivering a health signal for said front card and wherein said management card determines whether said front card is non-hotswappable by determining whether said pin is grounded.

8. A Compact Peripheral Component Interconnect (CPCI) system comprising:
   a circuit board;
   first and second slots on said circuit board;
   a system controller card coupled with said circuit board, said system controller card providing management and control functions; and
   a management card coupled with said system controller card;
   wherein said management card asserts a first radial reset signal via said first slot to a first front card on said first slot;
   wherein said management card asserts a second radial reset signal via said second slot to a second front card on said second slot;
   wherein said management card determines whether said first front card on said first slot is non-hotswappable;
   wherein said management card de-asserts said first radial reset signal to said first front card if said first front card is determined to be non-hotswappable;
   wherein said management card further determines whether said second front card on said second slot is hotswappable; and
   wherein said management card continues to assert said second radial reset signal to said second front card if said second front card is determined to be hotswappable.

9. The CPCI system of claim 8, wherein said system controller card asserts a global reset signal to said first front card and said second front card and wherein said system controller card further asserts a configuration signal to said front card and said second front card.

10. The CPCI system of claim 9, wherein said management card asserts a first radial power signal to said first slot and a second radial power signal to said second slot and wherein said first radial power signal is used to power on said first front card and said second radial power signal is used to power on said second front card.

11. The CPCI system of claim 9, wherein said configuration signal can be used by said front card to determine if it should operate in a mode comprising one a 64 bit mode and a 32 bit mode.

12. The CPCI system of claim 11, wherein said configuration signal is asserted when said global reset signal is de-asserted.

13. The CPCI system of claim 9, wherein said global reset signal is provided to said first front card via said management card.

14. The CPCI system of claim 9, wherein said management card continues to assert said first radial reset signal to said first front card if said first front is determined to be hotswappable.

15. The CPCI system of claim 8, wherein said system controller card asserts said global reset signal to said second front card if said second front card is determined to be non-hotswappable.

16. The CPCI system of claim 15, wherein said management card determines whether said first and second front cards are non-hotswappable by interpreting a health signal for each of said first and second front cards.

17. The CPCI system of claim 15, wherein said management card determines whether said first and second front card are non-hotswappable by determining whether a pin located on each of said first and second front cards is grounded.

18. A method for a hotswappable Compact Peripheral Component Interconnect (CPCI) system to support a non-hotswappable front card, said method comprising:

coupling a system controller card with first and second front cards via a circuit board;

providing management and control functions for said first and second front cards by said system controller card;

coupling a management card with said system controller card;

asserting a first radial reset signal to said first front card through said management card;

asserting a second radial reset signal to said second front card through said management card;

determining whether said first front card is non-hotswappable;

determining whether said second front card is non-hotswappable;

de-asserting said first reset radial signal to said first front card if said first front card is determined to be non-hotswappable; and continuing to assert said second radial reset signal to said second front card if said second front card is hotswappable.

19. The method of claim 18, further comprising:

asserting a global reset signal from said system controller card to said first front card if said first front card is determined to be non-hotswappable; and asserting a configuration signal via slot to said first front card:

wherein said first front card uses said configuration signal to configure itself into a bit mode comprising one of a 64 bit mode and a 32 bit mode;

wherein said global reset signal is asserted when said system controller card is powered on; and wherein said configuration signal is asserted when said global reset signal is de-asserted.

20. The method of claim 19, wherein said first card configures itself into said 64 bit mode if said front card is 64 bit capable.

21. The method of claim 19, wherein said first card configures itself into said 32 bit mode if said front card can not operate in said 64 bit mode.

* * * * *